Dec. 28, 1965 R. K. LITTLE 3,225,615

POSITIVE DRIVE MECHANISM

Filed June 14, 1962

INVENTOR:
ROBERT K. LITTLE
BY Howson & Howson
ATTYS.

United States Patent Office 3,225,615
Patented Dec. 28, 1965

3,225,615
POSITIVE DRIVE MECHANISM
Robert K. Little, Mount Holly, N.J., assignor of one-tenth to Henry Kohn, New York, N.Y.
Filed June 14, 1962, Ser. No. 202,467
5 Claims. (Cl. 74—416)

The present invention relates generally to positive drive mechanisms of the type wherein projections of a first element continuously coact in positive engagement with indentations in a second element, and more particularly to such a drive mechanism wherein the projections initially form and subsequently repeatedly reengage elastic deformations in an elastic surface layer of the second element.

A first object of the invention is to provide a positive drive mechanism of the type described which is adaptable for use with a variety of drive structures.

An additional object of the invention is to provide a positive drive mechanism of the type described which provides the desired interacting drive element engagement at a substantially lower manufacturing cost than is otherwise possible.

A further object of the invention is to provide a positive drive mechanism as described wherein the elastic deformations maintain a gripping pressure on the projections thereby eliminating the possibility of slack developing between the elements.

A still further object of the invention is to provide a positive drive mechanism as described in which the elasticity of the elastic surface layer permits relocation of the area of drive element coaction without disassociation of the drive elements.

Additional objects and advantages of the invention will be more readily apparent from the following detailed description of embodiments thereof when taken together with the accompanying drawings in which.

The invention briefly includes coacting drive elements, spaced projections of a first element engaging an elastic surface of a second element and producing elastic deformations therein. The elastic surface has a delayed elastic recovery characteristic permitting a reengagement of the deformations by ones of the projections upon continuing coaction of the elements. Since elastic recovery generally varies with temperature and time, it is necessary that the speed of operation of the coacting elements as well as the operating temperature of the elastic surface be considered in choosing an elastic material to provide a suitable rate of recovery.

Figure 1:
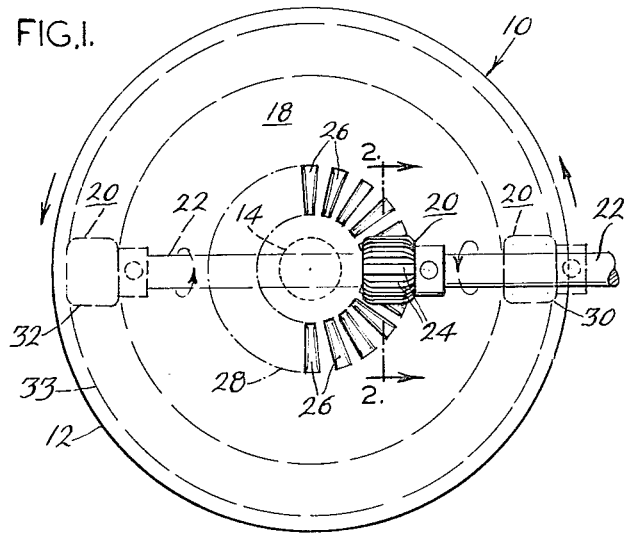
FIG. 1 is a plan view of a variable speed drive embodying the positive drive mechanism of the present invention, showing in broken lines various alternate positions of the coacting drive elements.

Referring to the drawings, FIG. 1 shows the invention embodied in a disc type variable speed drive generally designated 10. The variable drive includes an annular disc 12 mounted for rotation with concentric shaft 14. As shown in FIG. 1, disc 12 is mounted on an end of shaft 14 such that outer surface 16 of the disc presents an unobstructed surface. Secured to the surface 16 in a suitable manner is an elastic layer 18. The elastic layer consists of a material having delayed elastic recovery properties, for example a 40 durometer (Shore A) polyvinyl chloride.

Figure 6:
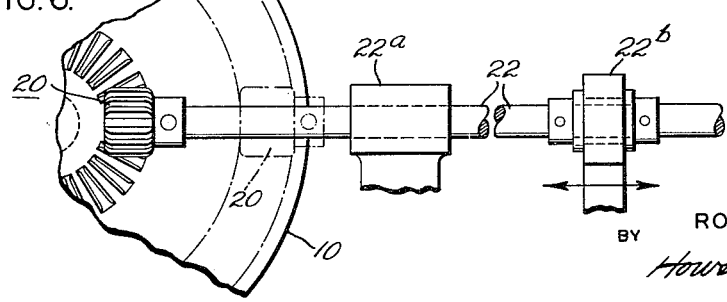
FIG. 6 is a partial plan view of the variable speed drive of FIG. 1, showing the pinion shaft mounting and positioning arrangement.

A pinion 20 is secured to shaft 22 which is disposed in perpendicular alignment with shaft 14. As shown in FIG. 6, bearing means 22a are provided to resiliently bias disc 12 against pinion 20. Shaft 22 is axially movable by means of shift arm 22b coacting with collars on the shaft, thus permitting relocation of the pinion to any point on the diameter of the disc. The pinion includes a drive surface consisting of parallel tooth-like projections 24, the ends of the projections being rounded to blend smoothly into the pinion body.

In operation, the drive elements, the disc 12 and the pinion 20, are place in resiliently biased relationship as shown in FIG. 1. One of the drive elements, for example, the disc 12, is driven in rotation by the shaft 14. Rotation of the disc produces a corresponding rotation of pinion 20 engaged therewith, projections 24 of the pinion forming deformations 26 in elastic layer 18 of the disc. The pinion forms an annular tooth-like track 28 of deformations on the disc, and, since the deformations forming the track are prolonged by the delayed elastic recovery of the layer, the pinion reengages the track deformations on continuous rotation of the drive elements.

Figure 2:
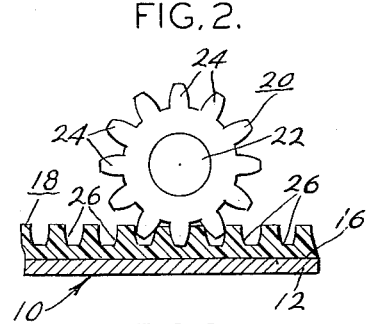
FIG. 2 is an enlarged sectional view taken along line 2—2 of FIG. 1 showing the coaction of the drive elements and the resulting deformations in the elastic surface.

There is, of course, some degree of elastic recovery of the deformations prior to reengagement by the pinion, and the pinion will, accordingly reform the deformations to a certain degree upon each engagement therewith. However, the elastic recovery properties of the layer are chosen such that at the speeds at which the mechanism is designed to run, the deformations are prolonged so as to be in substantially unrecovered form when presented for reengagement with the pinion as is shown in FIG. 2. The recurring engagement of the pinion with the prolonged deformations of the track on the disc provides a positive drive arrangement in which slippage cannot occur under appropriate loading conditions.

The elasticity of the layer 18 permits axial movement of pinion 20 into any desired position on the diameter of disc 12 while the drive mechanism is in operation. Such movement is facilitated by the rounded end configuration of the projections which prevents cutting of the elastic surface. Relocation of the pinion is illustrated in broken lines in FIG. 1 showing the pinion near the outer edge of the disc as at 30, and, for reverse rotation at the same speed, at 32. In either such position the deformations formed would constitute a track as outlined at 33. The pinion may be positioned at the center of the disc, in which position there would be no pinion rotation.

Figure 3:
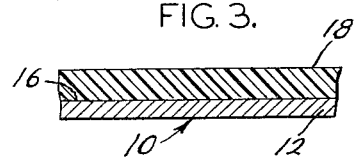
FIG. 3 is a view as in FIG. 2 with the projection drive element removed showing the elastic surface following complete elastic recovery of the deformations.

The important feature of the invention as embodied in the variable speed drive of FIG. 1 is the ability of the pinion to form a track of deformations in the elastic layer of the disc at any position at which the pinion is stationed. After one or more revolutions of the disc, the positive drive effect provided by the interengaging pinion projections and the track deformations will be consummated and continue until the rotation of the drive elements is halted or the pinion moved to a new location on the disc. The fact that the deformations are of a completely elastic nature permits a complete elastic recovery or relaxation of the formed surface areas shortly after engagement with the projections is terminated; as shown in FIG. 3, the deformations of FIG. 2 have completely disappeared. Thus a flat undeformed elastic surface is always available for relocation of the pinion on the disc.

Figure 4:
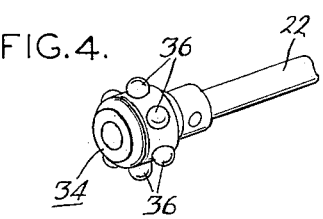
FIG. 4 is a view showing a modified form of projection drive element suitable for use with the variable speed drive of FIG. 1.

FIG. 4 shows a modified form of drive element suitable for use with the drive mechanism of FIG. 1. The modified element includes a cylindrical body 34 having spaced hemispherically-shaped projections 36 extending radially therefrom. The element is mounted on shaft 22 as a substitute for pinion 20 and operates in the same manner as the pinion, being particularly suitable for applications requiring frequent relocation of the element on the disc. The hemispherically-shaped projections because of their round surfaces, are more readily adapted to movement across the elastic layer than are the toothlike projections of the pinion.

For the same reason, the modified element is also better suited for applications in which the element is to be stationed at the non-rotating position at the center of the disc. The hemispherically-shaped projections will not cause interference and possible cutting of the elastic surface in this position as might occur in the case of the projections 24 of the pinion 20. On the other hand, the hemispherically-shaped projections will not provide the traction obtainable with the broad gear tooth type projections 24 and thus are more suitable for light load applications.

Figure 5:
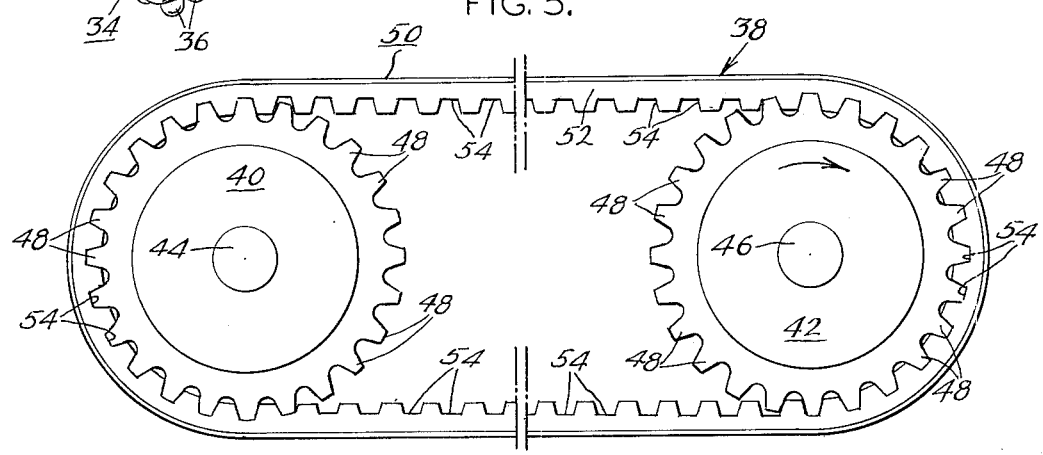
FIG. 5 is an elevational view of a belt drive embodying the present invention in which an elastic surfaced belt coordinates the rotation and angular disposition of toothed driving and driven elements.

FIG. 5 shows the invention embodied in a belt drive assembly generally designated 38 which comprises parallel sprockets 40 and 42 respectively mounted on shafts 44 and 46. Uniformly spaced projections 48, which in this instance are in the form of gear teeth, extend from the sprockets. An endless flexible belt 50 having an elastic inner surface layer 52 is disposed around the sprockets so as to resiliently bias the elastic inner surface layer 52 against the gear teeth projections 48 of the sprockets.

The operation of the belt drive assembly is effected upon rotation of a sprocket shaft, for example, shaft 46, which as indicated in the drawing is rotated to provide a clockwise rotation of sprocket 42. This effects a corresponding clockwise rotation of flexible belt 50 and sprocket 40. The projections 48 of sprockets 40 and 42 in bearing against the elastic layer 52 form deformations 54 in the elastic layer which, due to the delayed elastic recovery property of the elastic layer remain in substantially unrecovered form until engaged by the projections of the other drive sprocket. Thus, in a manner similar to that of the mechanism of FIG. 1, the sprockets form a track of deformations in the belt elastic layer which interengages the projections of the other sprocket, thereby synchronizing the rotation and angular disposition of the sprockets.

As was the case with the deformations of the FIG. 1 embodiment, the deformations 50, because of incipient elastic recovery, are reduced somewhat in size in traveling from one sprocket to the other, as shown in FIG. 5. As a result, the deformations are reformed somewhat upon each engagement with a sprocket. The recovery which takes place, is, of course, dependent upon the elastic recovery properties of the elastic layer at the temperature of operation as well as the speed of rotation of the belt and the distance between sprockets.

FIG. 5 shows the assembly as it would appear in operation with the belt and sprockets rotating in a clockwise direction. When the assembly is stopped, the deformations in the belt elastic layer not in contact with the sprockets gradually diminish and disappear upon complete elastic recovery or relaxation of the elastic layer.

The effectiveness of the elastic-layered belt as a timing belt is enhanced by the inherent characteristic of the elastic deformations to tightly envelop each sprocket projection so as to eliminate the possibility of slippage or looseness of the belt. Other types of timing belts such as molded belts suffer from a tendency to loosen due to wear, and the assembly of FIG. 5 is hence a valuable improvement over such belts. Additionally, the cost of an elastic-surfaced belt is substantially less than that of an equivalent sized molded belt, manufacturing costs possibly being as little as half the cost of molded belts.

The material comprising the elastic surface layer of the invention may be chosen from a wide variety of commercially available elastic materials, various plastics and elastomers appearing to be particularly well suited for such application. Polyvinyl chloride has been successfully used. Teflon extended with polyvinyl chloride would also provide the desired properties. Other materials having similar characteristics include phenol formaldehyde compounds, certain urea formaldehyde compounds, polyvinyl acetate, polystyrene, vinylidene, chloride, methyl methacrylate, cellulose nitrate, cellulose acetate various organic polysulfides and natural and synthetic rubbers. Although materials having a Shore A durometer rating of 35 to 40 are preferred, this is not a limiting factor, and the use of any material having the requisite elastic properties as discussed above is included within the scope of the invention.

The invention may be applied to a variety of drive mechanisms. For example, a reciprocating rack and pinion arrangement could be inexpensively assembled incorporating applicant's positive drive. Similarly many other types of drive mechanisms conventionally employing interacting toothed surfaces in recurring engagement could be constructed according to the present invention.

Manifestly, changes in details of construction can be effected by those skilled in the art without departing from the spirit and the scope of the invention as defined in and limited solely by the appended claims.

1 claim:

1. A positive drive mechanism comprising first and second perpendicularly disposed rotatable shafts, a disc mounted on an end of said first shaft adapted for rotation therewith, an elastic layer on the outer surface of said disc, said elastic layer having delayed elastic recovery properties, a pinion mounted on said second shaft adapted for rotation therewith, projectons extending radially from said pinion, means biasing said disc into resilient engagement with said pinion, said pinon projections producing elastic deformation in said elastic layer, said delayed elastic recovery properties of said elastic layer prolonging said deformations in substantially unrecovered form to permit reengagement of ones of said projections with ones of said deformations upon rotation of said shafts, thereby providing a positive drive effect therebetween.

2. A positive drive mechanism as claimed in claim 1, including means for varying the position of said pinion on said elastic surface, permitting variations in the relative speeds of rotation of said shafts.

3. A positive drive mechanism comprising a drive shaft, a drive sprocket mounted for rotation on said drive shaft, projections on said sprocket extending radially therefrom, a driven shaft disposed parallel to said drive shaft, a driven sprocket on said driven shaft having spaced projections extending therefrom corresponding with said drive sprocket projections, an endless flexible belt having an elastic inner surface disposed around said sprockets so as to resiliently bias said projections against said belt elastic surface, said projections producing elastic deformations in said elastic surface, rotation of said drive shaft and sprocket producing a corresponding rotation of said driven shaft and sprocket by coaction of said sprockets with said flexible belt, said elastic surface having delayed elastic recovery properties which prolong said deformations in substantially unrecovered form to permit reengagement of ones of said projections with ones of said deformations upon continuing rotation of said sprockets thereby providing a positive drive effect between said sprockets.

4. A positive drive mechanism, comprising a plurality of coactably disposed drive elements, drive surfaces on each of said drive elements, a plurality of spaced projections on at least one of said drive element surfaces, one surface comprising an elastic layer, said projections engaging with said elastic layer and producing elastic deformations in said elastic layer upon coaction of said drive elements, said elastic layer having delayed elastic recovery properties which prolong said deformations in substantially unrecovered form to permit reengagement of ones of said projections with ones of said deformations, the elasticity of said layer providing a complete recovery of said deformations absent reengagement of ones of said projections with ones of said deformations, coaction of said elements and engagement of said projections with said elastic layer deformations providing a positive drive effect between said drive elements.

5. A positive drive mechanism comprising coactably disposed first and second drive elements, first and second drive surfaces respectively on said drive elements, said first drive surface having a plurality of spaced projections thereon, said second surface comprising an elastic layer, said projections engaging with said elastic layer and producing elastic deformations in said elastic layer upon coaction of said drive elements, said elastic layer having delayed elastic recovery properties which prolong said deformations in substantially unrecovered form to permit reengagement of ones of said projections with ones of said deformations, the elasticity of said layer providing a complete recovery of said deformations absent reengagement of ones of said projections with ones of said deformations, coaction of said elements and engagement of said projections with said elastic layer deformations providing a positive drive effect between said drive elements.

References Cited by the Examiner
UNITED STATES PATENTS

| | | | |
|---|---|---|---|
| 9,544 | 1/1853 | Cook | 74—215 |
| 1,251,784 | 1/1918 | Joslin | 74—194 |
| 1,468,794 | 9/1923 | Blodgett | 74—416 |
| 1,518,473 | 12/1924 | Whaler | 74—10.54 |
| 2,249,514 | 1/1941 | Berg | 74—231 |
| 2,487,268 | 11/1949 | Oleson. | |
| 2,867,125 | 1/1959 | Glover | 74—230.7 |
| 2,873,340 | 2/1959 | Bourns et al. | 74—443 |
| 2,883,875 | 4/1959 | Davidson. | |
| 2,888,423 | 5/1959 | Spacht et al. | |
| 2,932,992 | 4/1960 | Larsh | 74—443 |
| 2,988,925 | 6/1961 | Sauer | 74—229 |
| 3,043,169 | 7/1962 | McCardell | 80—16.3 |
| 3,176,534 | 4/1965 | Rice et al. | 74—425 |

FOREIGN PATENTS 2,880   3/1885   Great Britain.

DAVID J. WILLIAMOWSKY, *Primary Examiner.*

BROUGHTON G. DURHAM, DON A. WAITE,
*Examiners.*

W. S. RATLIFF, *Assistant Examiner.*